Dec. 5, 1933.  E. J. W. RAGSDALE  1,938,499
APPARATUS FOR ELECTRIC WELDING
Filed Jan. 19, 1931
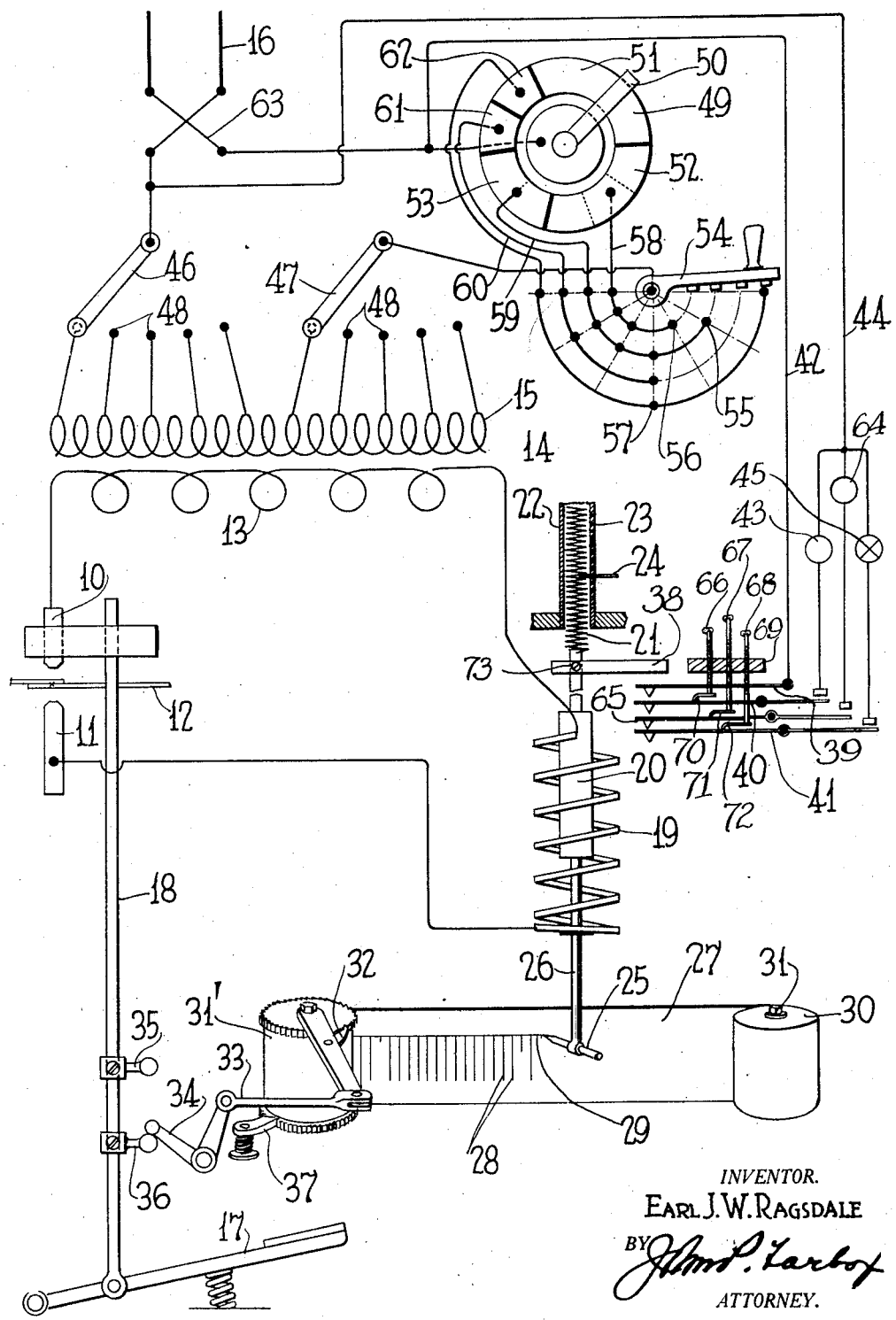
INVENTOR.
Earl J. W. Ragsdale
BY
ATTORNEY.

Patented Dec. 5, 1933

1,938,499

UNITED STATES PATENT OFFICE 1,938,499

APPARATUS FOR ELECTRIC WELDING

Earl J. W. Ragsdale, Norristown, Pa., assignor to Edward G. Budd Manufacturing Company, Philadelphia, Pa., a corporation of Pennsylvania Application January 19, 1931. Serial No. 509,578

26 Claims. (Cl. 219—4)

In order to continuously attain standards of efficiency and reliability of individual spot welds in the art of spot welding, it is highly desirable to know while the welds are being made, something of the degree of efficiency and reliability which are attained in the individual welds. If the degrees of efficiency and reliability are known at the time any given weld is made and they fall short of determinate standards, the weld can immediately be re-made or supplemented with other welds. Thereby adequate strength and safety factors in structures can be guaranteed.

To these ends heretofore it has been proposed to regulate the time of application of welding current to the primary of an alternating welding transformer, and to regulate power applied thereby. Such means, however, contain no indication of the efficiency and reliability of the individual weld, and make no comparison in respect to the determinate standard, not to mention a comparison of one weld with another, inasmuch as the periods of the times and the powers are regulated to equal values. Sometimes the time periods only are maintained equal, and sometimes the powers absorbed are maintained equal each to each. On account of the variations in the nature of the material being welded—variations in its physical characteristics, variations in the condition of the surfaces to be welded together, variations in the applied pressure, especially in the instance of manually regulated pressure often met with in portable welding machines, variations in the conditions of the electrodes, etc.,—regulation of periods of application of power and of quantity of power not infrequently produce widely different results in the welds themselves. Such variations in the efficiency and reliability of the weld are particularly to be avoided in the welding together of parts of relatively light gauge, of relatively small joints, of relatively small areas available for joining together, and in which as a consequence or otherwise, welds of very small area are the more desirable.

According to the method of my invention which is the subject matter of a copending application I spot weld by successively establishing as the welds are made comparative indications of the heat units of the individual welds for the guidance of the welder. By means of these indications I constitute visual comparative records whereby in the event the welding is done very rapidly under normal conditions, one may pause and inspect the individual records of the welds. The heat units of each weld are functions of the welding current and of the time of application of the current since the heat units are produced by the $I^2R$ energies absorbed in the material of the weld. So according to the method of my invention I contemplate establishing comparative indications of the products of the currents and periods of application of the currents of the individual welds. Preferably I establish comparative indications of the product of the current by the square of the time of application of the current to each individual weld.

More in detail, I apply extremely high amperages of current for instantaneous periods of time, and simultaneously with such instantaneous applications of current establish comparative indications of the heat units of the individual welds. Additionally I regulate the period of application of the current, but the current producing the heat energy I permit to vary in accordance with the physical conditions obtaining in and about the material of the weld. Thereby the comparative indications become indicative of the relative efficiencies and reliabilities of the welds through the indication of the developed heat units which they afford. Yet further, I constitute this indication a progressive series of parallel visual records with respect to a determinate base line, the better to afford instantaneously recognizable comparisons. The record is progressed through and by virtue of some part of the welding operation.

The apparatus proposed for the carrying out of this method is closely intertwined with the method itself. It comprises a comparative welding heat units indicator connected with the welding circuit. Such indicator is associated with the secondary circuit of an alternating current transformer. The timing device through which the periods of application of welding currents are controlled is associated with and controls the primary circuit of such transformer. The timing device is constituted an instantaneously acting controlling switch controlling the period of closure of the primary circuit to a source of power. The period of closure is adjustable by adjustment of the relative lengths of its circuit closing contacts. The indicator of heat units for the weld comprises an air core solenoid energized from the energy of the secondary circuit and having a plunger re-acted upon by an adjustable spring, and affording by the degree of its movement in action against the re-action of the spring an indicator of the product of the current flowing in the secondary through the weld and the time of application of that current. The time of application becomes a function of the movement of the plunger by reason of its inertia. The current measures the I²R energies in the weld, the voltage being a function of line and transformer conditions and unregulated except as such conditions may be substantially constant. The time of application of the current as entering through the action of the plunger against its inertia conjoins with the current to constitute the indication truly a comparative indication of the heat units of the weld.

Both the method and the apparatus will be the more readily understood from a consideration of the attached sheet of drawing the single figure of which depicts the apparatus diagrammatically.

The electrodes of the welding circuit are designated 10 and 11. Work between them is designated generally 12. The electrodes are in circuit in the secondary 13 of an alternating current transformer 14. The primary of this transformer is designated 15 and is shown as deriving its power from a line 16 which may be regarded as the source. The electrodes are adapted to be drawn together and with a requisite degree of pressure upon the work 12 by means of the foot lever operated system 17, including a vertically extending connecting rod 18 of which is diagrammed as connected with the upper electrode 10. The lower electrode for the purposes of description may be assumed to be fixed.

The circuit of the secondary 13 supplying the electrodes 10 and 11 is passed through the coils of an appropriately heavy solenoid 19. This solenoid is vertically arranged. Arranged to move axially within it is a plunger 20 which is suspended above the bottom of the coil and in appropriate relation for reaction of the pull which coil 19 is desired to exert upon it by means of a coiled spring 21. Spring 21 is adjusted as to length in order to attain an adjustment of tension and a uniformity of tension. The adjustment is shown to be in the form of a vertically extending tube 22 housing the body of the spring and provided with transversely extended slots 23 in one side through which a plate 24 may be adjustably projected between the various turns of the spring.

The lower end of the plunger 20 carries an indicating or recording pencil 25 by means of a depending connecting rod 26. This pencil 25 is juxtaposed to a progressing record tape 27 in such a manner as to record thereon, when plunger 20 is vertically reciprocated, a series of parallel lines 28 emanating from a determinate base line 29 drawn longitudinally of the strip 27. Record tape 27 emanates from a roll 30 carried on a fixed axis 31 and is progressed to a re-wind roll 31' to which a step by step progressive movement may be imparted by a pawl and ratchet 32. The pawl and ratchet are operated by a link connection 33 to a bell crank 34 one arm of which is engaged by adjustable upper and lower tappets 35—36 carried by the connecting rod 18 of the foot lever mechanism 17 for operating the electrodes. The arrangement is such that retraction of pawl 32 is instituted by bringing the electrodes into the welding contact with the work, and the record tape 27 is progressed one step on the reverse movement of the electrodes as they leave the work. The re-wind roll 31 is held in its normal position against retraction of pawl 32 by a holding pawl 37.

The upper end of plunger 20 bears an arm 38 arranged in juxtaposed position to a series of contacts 39, 40, 65 and 41, 39 of which is a line contact reaching to the source of power through connection 42, while contacts 40, 41 and 65 are lamp contacts, the near one of which 40 connects with the opposite side of the source of power through say a white lamp 43 and common conductor 44, while the far one 41 connects similarly through say a red lamp 45. The intermediate contact 65 effects the operation of a signal means 64. Contacts 40, 65 and 41 are adjustable relatively to elements 38 and 39 by the stop screws shown.

The primary 15 of the transformer is adjustable as to the number of turns connected with the source of power 16 through a pair of switches 46 and 47 adapted to cut in and out successively the number of turns of the primary by sweeping over the contacts 48 connected with various portions of the winding.

The primary 15 is normally disconnected from the source 16 through an instantaneous timing switch 49 of the type described in detail in my copending application Serial No. 495,044, filed Nov. 12, 1930. In this type potential energy is applied to a movable contact 50 to instantaneously sweep it over a circle of fixed contacts 51, 52, 53, etc. and thereby connect the primary 15 to the source 16 for a length of time, a function of the number of contacts 51, 52, etc. which may at the time be connected in series together. The number of such contacts connected in series together is determined by the placement of a switch arm 54 with relation to the various combinations of contacts 55, 56, 57, etc. which connect by conductors 58, 59, 60, etc. with the segments 51, 52, 53, etc. Thus when arm 54 rests on contacts 55, segment 53 only will be connected in circuit with primary 15 through conductor 59. Thus when it rests on group 57 not only segment 53 but also segments 61 and 62 will be connected together, thus enlarging the arc of contact of the movable member 50 with the fixed members of the series 51, 52, etc., from the arc comprehended by the segment 53 to that comprehended by the segments 53, 61, 62 together.

In operation assuming the source 16 is connected to the apparatus at large through a line switch 63, and assuming an operator has placed work 12 between the electrodes and has pressed mechanism 17 with his foot, the operation of the method of my invention is carried out by the depicted apparatus as follows. As connecting rod 18 of the foot operated mechanism 17 descends, tappet 35 engages bell crank 34 and retracts pawl 32, placing it in position to progress the record 27 upon completion of the weld and release of mechanism 17. The operation of mechanism 17 by means not shown but corresponding to that disclosed in my copending application aforesaid, stores up potential energy in the movable arm 50 of the time switch 49 which energy at an appropriate point in the downward movement of mechanism 17 and when the pressure of electrodes 10 and 11 upon the work 12 is adequate, is released and drives arm 50 instantaneously around the circle of segments 51, 52 and 53, etc., closing the primary circuit 15 to the source 16. The current induced in the secondary 13 effects the welds. That current which does flow and produces by reason of its application a determinate B. t. u. which effects the weld, also passes through the solenoid 19. The instantaneously set up magnetic field of this solenoid acts on its plunger 20, and is re-acted against by the inertia of the plunger 20 and the uniform pressure of the adjusted spring 21 by means of which the plunger 20 is suspended. The plunger accelerates and moves downwardly a distance truly proportionate to the product of the current in the solenoid 19 and the time of application of that current carrying the recording pencil 25 across the record strip 27 and making a vertically extending record mark 28 parallel to others already made or which are subsequently to be made and of an extent measuring the movement of plunger 20 against its inertia. Actually, as can be mathematically demonstrated, I believe this indicating and recording movement of the plunger 20 to be proportional to the current multiplied by the square of the time, such movements of the plunger and such records of the B. t. u. absorbed by the welds being made, constitute instantaneously made visual comparisons as between the individual welds. They are made simultaneously with the instantaneous control of the time of application of the welding current as effected by the timing device 49.

Likewise instantaneously there are afforded other visual indications of the nature of the weld in the form of the lamps 43 and 45. Arm 38 is adjusted, as at 73, so that with the normal and proper movement of the plunger 20 indicating a normal and desired efficiency and reliability of a weld in a given gauge of material, it engages contact 39 with contact 65 and lights a white light 64. If, however, the weld is unduly prolonged, prolonged sufficiently to burn the material being welded or otherwise deleteriously affect it, arm 38 descends still further engaging also contact 41 and lighting also the red lamp 45 and constituting it a danger signal. Other such signals may be arranged with respect to arm 38, as for example, an indication that the weld is of insufficient current. Indeed, this may be afforded by the apparatus as diagrammed in that if the heat units are insufficient to achieve the efficiency and reliability desired, arm 38 may not effect contact between points 39 and 65 and the lamp 43 will be illuminated. Indeed a subnormal weld may be indicated by the lack of signal if one of the contacts is omitted and those remaining indicate normal and above normal welds. The number of contacts and the relation thereof to signals are readily variable. The stop screws 66, 67, and 68 are adjustable, as aforedescribed, having a securement base 69, being a part fixed. The stop screws may be at the side of the contacts and project in between the contacts as at 70, 71 and 72 to obtain their effective adjustment.

Innumerable variations in the apparatus and method which I have devised may be achieved without departing from the spirit of my invention. For example, heat units may be indicated in other ways beside the product of the current of the weld and time. The primary rather than the secondary current may be made use of to afford the measure of these heating units in approximation at least. My heat units indicator 20 is in series with the secondary circuit. It may be connected in shunt or otherwise derived. One or another of the various well known watt meter relays of the prior art might with appropriate modification be substituted for the indicator I have devised. The devices may take widely different forms without departing from the generic spirit of my invention. Accordingly in the annexed claims there should be imposed no limitations not growing out of the prior art itself and each and all terms should be rendered independently of their circumstantial choice.

The method of my invention is of particular applicability in the welding of aircraft structures where it is of prime importance for the safety of the users that each individual weld be as strong as is consistent with the space available.

What I claim as new and useful and desire to protect by Letters Patent is:—

1. In combination a welding circuit, and a comparative welding heat units indicator connected therewith to comparatively indicate the heat units of the successive individual welds.

2. In combination a welding circuit, and a comparative welding heat units indicator connected therewith to comparatively indicate the heat units of the successive individual welds, together with additional means associated with the circuit to regulate the period of the weld.

3. In combination, an alternating welding current transformer, means to regulate the period of the weld connected with the primary of the transformer, and a comparative welding heat units indicator connected with the secondary of the transformer to separately indicate the heat units of the successive individual welds.

4. In combination, a welding circuit and a solenoid energized from said circuit and constituting through the degree of its energization an indicator of the power absorbed in said circuit.

5. In combination, a welding circuit and an air core solenoid energized from said circuit and constituting through the degree of its energization an indicator of the power absorbed by said circuit.

6. In combination, an instantaneously energized welding circuit and solenoid connected with said circuit and energized thereby and constituting through the degree of its energization an indicator of the power absorbed by the welding circuit.

7. In combination, an instantaneously energized welding circuit and an air core solenoid connected in series with said circuit to be energized thereby and constituting through the degree of its energization an indicator of the power absorbed by the weld.

8. In combination, a welding circuit, a solenoid connected with said circuit to be energized thereby, and a recorder of the degree of energization of said solenoid.

9. In combination, a welding circuit, a solenoid connected with said circuit to be energized thereby, and a step by step recorder of the degree of energization of said solenoid actuated in conjunction with the welding operation.

10. In combination, an electric welding circuit and an individually recording indicator for the successive energies supplied to said circuit.

11. In combination, a welding circuit, an indicator connected to said circuit to individually comparatively indicate the power supplied to each weld, and warning standards of indication associated with said indicator.

12. In combination, a welding circuit, an indicator connected to said circuit to individually comparatively indicate the power supplied to each weld, and visual warning standards of indication associated with said indicator.

13. In combination, a welding circuit, means connected to said circuit variably responsive in accordance with the amount of power supplied to each weld, and warning standards of indication associated with said means.

14. In combination, a welding circuit, means whose operation is effected by the energization of said circuit and is variably responsive in accordance with the amount of power supplied to each weld, and warning standards of indication associated with said means, and means for adjusting the standards with respect to a determinate normal.

15. In combination, a welding circuit, means whose operation is effected by the energization of said circuit and is variably responsive in accordance with the amount of power supplied to each weld, and warning standards of indication associated with said means, and means for adjusting the range of heat units covered by said warning standards.

16. In combination, a welding circuit, means whose operation is effected by the energization of said circuit and is variably responsive in accordance with the amount of power supplied to each weld, and warning standards of indication associated with said means, and signal means associated with said standards to indicate the application of a determinate normal of power supplied to a weld, and additional signal means arranged to indicate the application to the weld of power more than the determinate normal.

17. In combination, a welding apparatus including welding and energizing circuits, and means whose operation is effected by the energization of the circuits and constituting through the degree of its energization an indicator of the heat units absorbed by a weld, and means including a signal indicating the application to a weld of a number of heat units below a determinate normal.

18. In combination, a welding apparatus including welding and energizing circuits, and means whose operation is effected by the energization of the circuits and constituting through the degree of its energization an indicator of the heat units absorbed by a weld, and means including a signal indicating the application to a weld of a number of heat units above a determinate normal.

19. In combination, a welding apparatus including welding and energizing circuits, and means whose operation is effected by the energization of the circuits and constituting through the degree of its energization an indicator of the heat units absorbed by a weld, and means whose operation is effected thereby including a signal indicating the application to a weld of a number of heat units corresponding to a determinate normal.

20. In combination, a welding apparatus including welding and energizing circuits, and means whose operation is effected by the energization of the circuits and constituting through the degree of its energization an indicator of the heat units absorbed by a weld, and means whose operation is effected thereby including a signal indicating the application to a weld of a number of heat units corresponding to a determinate normal and a signal indicating the application to a weld of a number of heat units below the determinate normal.

21. In combination, a welding circuit, and a comparative heat units indicator operatively connected therewith to comparatively indicate the heat units of the successive individual welds, and means adjustable to provide variable pre-fixed ranges of comparative indication.

22. In combination, a welding circuit, means operatively connected with said circuit variably responsive in accordance with the amount of power supplied to each weld, and warning standards of indication associated with said means, and adjustable means arranged to preset said first-named means whereby said first-named means is variably responsive in accordance with the amount of power supplied to each weld within preset ranges.

23. In combination a welding circuit, and a comparative welding heat units indicator whose operation is effected by the energization of said circuit and which is arranged to comparatively indicate the heat units of the successive individual welds, and means for adjusting the indications to represent variable amounts of heat.

24. In combination a welding circuit, and a comparative welding heat units indicator whose operation is effected by the energization of said circuit and which is arranged to comparatively indicate the heat units of the successive individual welds, and signals whose operations are effected by the operation of said indicator and which are arranged to afford below normal, normal and above normal indications, together with means to adjust the indication covering the below to above normal range to variable numbers of heat units comprehended by the range.

25. In combination, a spot welding device including welding and energizing circuits, means whose operation is effected by the energization of the circuits and constituting through the degree of its energization an indication of the heat units absorbed by the weld, means providing indications of the relation of the heat units applied to the weld to a determinate normal, and adjustable means for effecting variable sensitivity of said indications as afforded.

26. In combination, a welding apparatus including welding and energizing circuits, means whose operation is effected by the energization of the circuits and constituting through the degree of its energization a measure of the heat units absorbed by a weld, a circuit which when operated affords the operator a sensory impression of its operation, and control means for said last named circuit operated by said heat measuring means upon the application of an abnormal number of heat units to the weld.

EARL J. W. RAGSDALE.